(12) United States Patent
Morii et al.

(10) Patent No.: US 7,864,284 B2
(45) Date of Patent: Jan. 4, 2011

(54) TRANSFLECTIVE LIQUID CRYSTAL DISPLAY DEVICE WITH COLUMNAR SPACERS

(75) Inventors: Yasuhiro Morii, Tokyo (JP); Yoshimitsu Ishikawa, Tokyo (JP); Hiroshi Teramoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 317 days.

(21) Appl. No.: 11/277,715

(22) Filed: Mar. 28, 2006

(65) Prior Publication Data

US 2006/0290872 A1    Dec. 28, 2006

(30) Foreign Application Priority Data

Jun. 23, 2005    (JP)    ............................. 2005-183252

(51) Int. Cl.
  *G02F 1/1335*    (2006.01)
  *G02F 1/1333*    (2006.01)
  *G02F 1/1339*    (2006.01)

(52) U.S. Cl. ...................... 349/155; 349/156; 349/106; 349/114; 349/110

(58) Field of Classification Search ................. 349/156
  See application file for complete search history.

(56) References Cited

U.S. PATENT DOCUMENTS

| 6,864,945 | B2 | 3/2005 | Fujimori et al. | |
|---|---|---|---|---|
| 2002/0075441 | A1* | 6/2002 | Fujimori et al. | ............. 349/155 |
| 2002/0171791 | A1* | 11/2002 | Anno et al. | ................. 349/113 |
| 2004/0012738 | A1 | 1/2004 | Murai et al. | |
| 2004/0046922 | A1* | 3/2004 | Yanagawa et al. | ........... 349/155 |
| 2004/0095528 | A1 | 5/2004 | Nakamura et al. | |
| 2004/0169810 | A1 | 9/2004 | Fujimori et al. | |
| 2004/0201814 | A1* | 10/2004 | Yamamoto | .................. 349/156 |
| 2005/0213005 | A1 | 9/2005 | Murai et al. | |

FOREIGN PATENT DOCUMENTS

| JP | 8-29778 | 2/1996 |
|---|---|---|
| JP | 2002-72220 | 3/2002 |
| JP | 2002-214624 | 7/2002 |

(Continued)

OTHER PUBLICATIONS

U.S. Appl. No. 11/421,233, filed May 31, 2006, Teramoto et al.

(Continued)

*Primary Examiner*—David Nelms
*Assistant Examiner*—Lauren Nguyen
(74) *Attorney, Agent, or Firm*—Oblon, Spivak, McClelland, Maier & Neustadt, L.L.P.

(57) ABSTRACT

A transflective liquid crystal display device provided with columnar spacers is provided that can suppress variation in color tone of white in a reflective mode and can minimize degradation in reflectivity even when a coloring material used for a transmissive region and a coloring material used for a reflective region are the same. The device includes a color filter substrate, a TFT substrate, a liquid crystal material sandwiched by the color filter substrate and the TFT substrate, columnar spacers formed only in pixels having a green coloring material and defining a cell gap, and light-blocking portions provided only in predetermined regions in the vicinity of locations where the columnar spacers are formed.

6 Claims, 7 Drawing Sheets

FOREIGN PATENT DOCUMENTS

| | | |
|---|---|---|
| JP | 2003-215560 | 7/2003 |
| JP | 2003-279945 | 10/2003 |
| JP | 2003-280000 * | 10/2003 |
| JP | 2003-330040 | 11/2003 |
| JP | 2003-344838 | 12/2003 |

OTHER PUBLICATIONS

U.S. Appl. No. 12/481,744, filed Jun. 10, 2009, Morii, et al.

* cited by examiner

TRANSFLECTIVE LIQUID CRYSTAL DISPLAY DEVICE WITH COLUMNAR SPACERS

BACKGROUND OF THE INVENTION

1. Field of the Invention

The present invention relates to transflective liquid crystal display devices, and more particularly to a transflective liquid crystal display device having columnar spacers.

2. Description of the Background Art

A common transflective liquid crystal display device is provided with a transmissive region, which transmits light from a backlight, and a reflective region, which reflects ambient light incident on a liquid crystal layer, within each of pixels in a substrate on which TFTs (Thin Film Transistors) are formed (hereinafter may be referred to as a "TFT array substrate"). Meanwhile, a substrate on which a color filter using red, green, and blue coloring materials is formed (which hereinafter may be referred to as a "color filter substrate") is provided opposing the TFT array substrate. The TFT array substrate and the color filter substrate sandwich the liquid crystal layer.

In this kind of transflective liquid crystal display device, the thickness of the liquid crystal layer (also referred to as a "gap between the TFT array substrate and the color filter substrate", or a "cell gap") is made different between the transmissive region and the reflective region within each of the pixels in order to make the optical path lengths of transmitting light and reflecting light uniform. Specifically, in the case that the thickness of the liquid crystal layer in the transmissive region is dt, the thickness of the liquid crystal layer in the reflective region is generally set at ½ dt. When the thickness of the liquid crystal layer is different between the regions in this way, the thickness of the liquid crystal layer in the reflective region particularly requires severe control. For this reason, spacers using a photosensitive organic film (hereinafter also referred to as "columnar spacers") may be formed in some cases on the color filter substrate side or the TFT array substrate side, as a means to control the thickness of the liquid crystal layer. A transflective liquid crystal display device employing the columnar spacers is described in detail in Japanese Patent Application Laid-Open No. 2003-344838.

As a common technique for aligning liquid crystal, a rubbing technique is used in which polyimide films are formed on a color filter substrate and a TFT array substrate by a transfer method and the formed polyimide films are rubbed by a cloth in which hair is weaved. In the case of the transflective liquid crystal display device discussed above, columnar spacers are formed on the color filter substrate side or the TFT array substrate side before the substrates are subjected to rubbing; therefore, the rubbing cannot be done uniformly in the areas surrounding the spacers, causing nonuniformity in the alignment state of liquid crystal. This nonuniformity in the alignment state of liquid crystal can become a cause of such problems as degradation in contrast or development of domains in the transflective liquid crystal display device.

Generally, columnar spacers are disposed on a light-blocking film within pixel regions that do not adversely affect the display operation. However, because the columnar spacers are formed from a photosensitive organic film, their sizes are limited, and they need to have a diameter of 10 μm or greater, taking the strength originating from its pattern and the problem of peeling-off into consideration. For that reason, it has been common practice to dispose the columnar spacers in blue pixels, which have low transmissivity (in the case of a color filter that uses coloring materials of three primary colors, red, green, and blue) in order to alleviate the degree of effect to contrast degradation and domain development (the degree of noticeability in appearance).

In the color filter using coloring materials of three primary colors of red, green, and blue, the green coloring material, which has a high luminosity, is made to have good characteristics in order to increase transmissivity. Therefore, if those coloring materials are used for a transflective liquid crystal display device, a problem arises that the color tone of white shifts toward yellow in a reflective mode.

Japanese Patent Application Laid-Open No. 2003-344838 discloses a technique for improving this problem by varying a color filter in the reflective region and that in the transmissive region. Nevertheless, in the case of Japanese Patent Application Laid-Open No. 2003-344838, there has been a problem that the types of coloring materials for the color filters need to be changed from conventionally-used three colors to six colors, which necessitates high manufacturing cost.

Another technique has been proposed in which holes are formed in the coloring material of the reflective region and a transparent resin is formed therein so that the color tone of white can be adjusted in a reflective mode. The problem in using this technique, however, is that although white color can be modulated, light with other wavelengths leaks from the transparent resin portion, causing the purities of red color, green color, and blue color to deteriorate, and thus degrading the appearance in terms of display.

Moreover, another problem has been that disposing the above-mentioned columnar spacers in the blue color pixel region decreases the quantity of light from the blue color pixel region, further varying the color tone of white. In order to suppress the variation in white color tone, the light-blocking portions that are to be formed in the vicinity of the columnar spacers are formed also in the blue color pixel regions, the red color pixel regions, and the green color pixel regions. A problem with this method, however, is that the proportion of the light-blocking regions that occupy the pixel regions increases, and consequently the reflectivity lowers.

SUMMARY OF THE INVENTION

It is an object of the present invention to provide a transflective liquid crystal display device provided with columnar spacers that can prevent variation in color tone of white in a reflective mode and minimize degradation in reflectivity even when the coloring material used for a transmissive region and the coloring material used for a reflective region are the same in the transflective liquid crystal display device.

A transflective liquid crystal display device according to the present invention includes a first substrate, a second substrate, a liquid crystal material, columnar spacers, and light-blocking portions. The first substrate has a light-blocking film, and a color filter in which red, green, and blue coloring materials form respective pixels. The second substrate has a transmissive pixel electrode that forms transmissive regions within the pixels, a reflective pixel electrode that forms reflective regions within the pixels, and wiring lines for supplying a control signal and a signal applied to the transmissive pixel electrode and the reflective pixel electrode. The liquid crystal material is sandwiched between the first substrate and the second substrate. The columnar spacers are formed only for the pixels having the green coloring material, and define a gap between the first substrate and the second substrate. The light-blocking portions are provided only in predetermined regions in the vicinity of locations where the columnar spacers are formed.

In the transflective liquid crystal display device of the present invention, the columnar spacers are formed only in the pixels having the green coloring material and the light-blocking portions are provided only in the predetermined regions in the vicinity of the locations where the columnar spacers are formed; therefore, it is possible to suppress variation in white color tone in a reflective mode and to minimize degradation in reflectivity, even if the coloring material used for the transmissive region and the coloring material used for the reflective region are the same.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferred Embodiment

Figure 1:
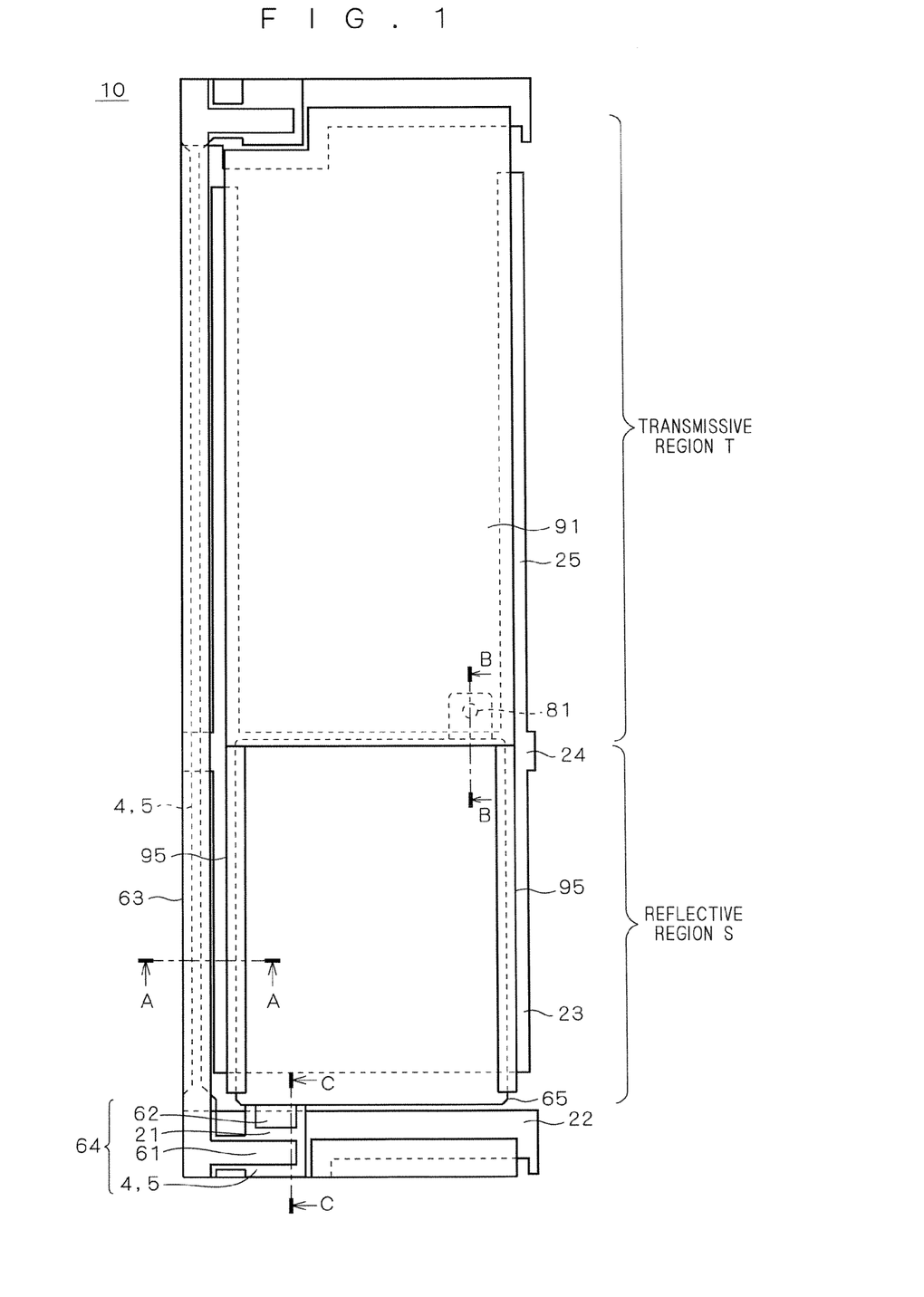
FIG. 1 is a plan view of a TFT array substrate of a transflective liquid crystal display device according to a preferred embodiment of the present invention.

FIG. 1 is a plan view schematically illustrating a TFT array substrate of a transflective liquid crystal display device according to the present preferred embodiment. Referring to FIG. 1, a transmissive region T that transmits light and a reflective region S that reflects ambient light incident on a liquid crystal layer are formed in each of pixels provided on a TFT array substrate 10. FIGS. 2A through 2D are cross-sectional views for illustrating a manufacturing method of the TFT array substrate of the transflective liquid crystal display device according to the present preferred embodiment. Each of FIGS. 2A to 2D depicts a cross section of a source line portion and a reflective region S (line A-A in FIG. 1), a cross section of a transmissive region T and the reflective region S (line B-B in FIG. 1), and a cross section of a TFT (line C-C FIG. 1) hypothetically in one cross-sectional view.

Referring to FIG. 1 and FIGS. 2A to 2D, a gate line 22 provided with a gate electrode 21 and made of a first conductive film, and an auxiliary capacitance line 24 provided with a first auxiliary capacitance electrode 23 formed in the reflective region S and a second auxiliary capacitance electrode 25 formed in the transmissive region T are formed on a transparent insulative substrate 1 made of glass substrate or the like. Here, the first auxiliary capacitance electrode 23, the second auxiliary capacitance electrode 25, and the auxiliary capacitance line 24 are provided for the purposes of preventing light leakage from a backlight and holding voltage for a certain period of time.

A first insulating film 3 is provided to be an upper layer over the gate line 22 and so forth. A semiconductor active film 4 and an ohmic contact film 5, which are semiconductor layers, are formed over the first insulating film (gate insulating film) 3 above the gate electrode 21. This ohmic contact film 5 is divided into two regions by removing its center portion, and a source electrode 61 made of a second conductive film is stacked on one of the regions while a drain electrode 62 made of the second conductive film is stacked on the other one of the regions. Here, the semiconductor active film 4, the ohmic contact film 5, the gate electrode 21, the source electrode 61, and the drain electrode 62 constitute a TFT 64 that is a switching element.

A source line 63 extending from the source electrode 61 is provided so as to intersect with the gate line 22 over the first insulating film 3. The semiconductor active film 4 and the ohmic contact film 5 are left remaining in the intersection portion and the source line 63 in order to improve withstanding voltage.

A reflective pixel electrode 65 extending from the drain electrode 62 is formed in the reflective region S. In other words, the reflective pixel electrode 65 is formed of the second conductive film. For this reason, a material that has a metal film with a high reflectivity at least for its surface layer is used for the second conductive film. It should be noted that the source line 63 connected to the source electrode 61 is also formed of the second conductive film. In addition, in order to prevent defects due to short-circuiting between the reflective pixel electrode 65 and the source line 63, the reflective pixel electrode 65 is disposed so as to keep a predetermined distance L from the source line 63 (preferably from about 5 μm to about 10 μm).

A second insulating film 7 is provided so as to cover the reflective pixel electrode 65 and so forth, and a portion of the second insulating film 7 that is above the reflective pixel electrode 65 is removed to form a contact hole 81. A transmissive pixel electrode 91 made of a conductive film with a high transmissivity (hereinafter also referred to as a "transparent conductive film") is formed to be an upper layer over the second insulating film 7, forming a transmissive region T. The transmissive pixel electrode 91 is electrically connected to the reflective pixel electrode 65 via the contact hole 81 and is further electrically connected to the drain electrode 62 via the reflective pixel electrode 65. In addition, a contrast reduction-preventing electrode 95 is provided between the reflective pixel electrode 65 and the source line 63 over the second insulating film 7. This contrast reduction-preventing electrode 95 is a transparent conductive film, and is formed simultaneously with the transmissive pixel electrode 91. In the present preferred embodiment, the contrast reduction-preventing electrode 95 is formed along the source line 63 and substantially parallel thereto.

Next, the manufacturing process of the TFT array substrate 10 of the transflective liquid crystal display device according to the present preferred embodiment is described with reference to FIGS. 2A to 2D.

Figure 2A:
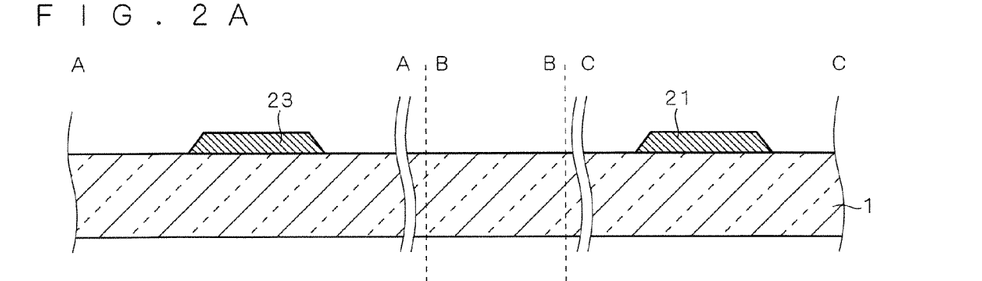
FIGS. 2A through 2D are cross-sectional views illustrating the TFT array substrate of the transflective liquid crystal display device according to the preferred embodiment of the present invention.

First, as illustrated in FIG. 2A, the transparent insulative substrate 1 made of glass substrate or the like is washed to clean its surfaces, and thereafter, the first conductive film is deposited on the transparent insulative substrate 1 using sputtering or the like. The first conductive film is a thin film made of, for example, an alloy having chromium (Cr), molybdenum (MO), tantalum (Ta), titanium (Ti), or aluminum (Al) as its main component. In the present preferred embodiment, a chromium film having a film thickness of 400 nm is deposited as the first conductive film.

Next, in a first photolithography process step, the first conductive film is patterned to form the gate electrode 21, the gate line 22, the first auxiliary capacitance electrode 23, the auxiliary capacitance line 24, and the second auxiliary capacitance electrode 25. The first auxiliary capacitance electrode 23 is formed over substantially the entire surface of the reflective region S, while the second auxiliary capacitance electrode 25 is formed in a portion of the transmissive region T so as to be parallel to the source line 63. The auxiliary capacitance line 24 is electrically connected to the first auxiliary capacitance electrode 23 and the second auxiliary capacitance electrode 25, and is formed so as to be along the source line 63. In the first photolithography process step, first, after washing the substrate and then applying and drying a photosensitive resist, exposure is carried out using a mask having a predetermined pattern. Then, in the first photolithography process step, by developing the substrate that has been subjected to the exposure, a resist is formed based on the mask pattern that has been transferred onto the substrate, and after heat-curing the resist, the first conductive film is etched to pattern the first conductive film. In the first photolithography process step, after the patterning of the first conductive film, the photosensitive resist is peeled off.

It should be noted that the first conductive film may be etched by wet etching using a publicly known etchant. For example, when the first conductive film is made of chromium, an aqueous solution in which diammonium cerium (IV) nitrate and nitric acid are mixed may be used. In addition, in etching the first conductive film, it is preferable to adopt taper etching that forms the cross section of the pattern edge into a trapezoidal tapered shape, in order to improve the coverage of the insulating film at the stepped portion of the pattern edge and prevent short-circuiting with other wiring lines.

Figure 2B:
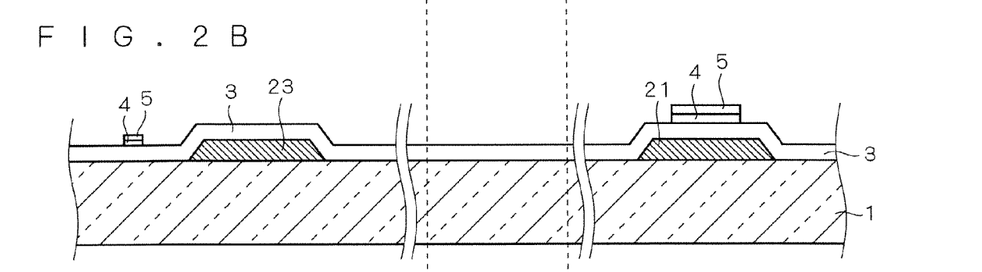

Next, as illustrated in FIG. 2B, the first insulating film 3, the semiconductor active film 4, and the ohmic contact film 5 are successively deposited using plasma CVD or the like. A single-layer film or a multi-layer film of any of SiNx film, SiOy film, and SiOzNw film (wherein x, y, z, and w are positive numbers representing stoichiometric compositions) may be used for the first insulating film 3 that forms a gate insulating film. If the film thickness of the first insulating film 3 is thin, short-circuiting tends to occur easily at the intersection portion of the gate line 22 and the source line 63, while if it is thick, the ON current of the TFT 64 becomes small, degrading display performance. For these reasons, it is preferable that the first insulating film 3 should be formed to be as thin as possible but thicker than the first conductive film. In addition, it is preferable that the first insulating film 3 should be deposited in several times, in order to prevent interlayer short-circuiting due to formation of pinholes and the like. In the present preferred embodiment, a SiN film having a film thickness of 300 nm is deposited and thereafter a SiN film having a film thickness of 100 nm is deposited, whereby a SiN film having a film thickness of 400 nm is formed as the first insulating film 3.

An amorphous silicon (a-Si) film, a polysilicon (p-Si) film, and the like may be used as the semiconductor active film 4. If the film thickness of the semiconductor active film 4 is thin, the film disappears in the later-described dry etching of the ohmic contact film 5, while if it is thick, the ON current of the TFT 64 becomes small. For these reasons, the film thickness of the semiconductor active film 4 needs to be determined taking into account the controllability of the etching amount during the dry etching of the ohmic contact film 5 and the value of the necessary ON current of the TFT 64. In the present preferred embodiment, a semiconductor active film 4 made of an a-Si film having a film thickness of 150 nm is deposited.

An n-type a-Si film in which a-Si is doped with a trace amount of phosphorus (P), or an n-type p-Si film may be used as the ohmic contact film 5. In the present preferred embodiment, an n-type a-Si film having a film thickness of 30 nm is deposited as the ohmic contact film 5.

Next, a second photolithography process step is carried out to pattern at least the portions of the semiconductor active film 4 and the ohmic contact film 5 with which the TFT 64 is to be formed. In addition to the portions of the semiconductor active film 4 and the ohmic contact film 5 with which the TFT 64 is to be formed, the semiconductor active film 4 and the ohmic contact film 5 may be left remaining in the portions of the intersection portion of the gate line 22 and the source line 63 (S/G cross portion) and in the portion where the source line 63 is to be formed, and thereby withstanding voltage can be increased. It should be noted that the etching of the semiconductor active film 4 and the ohmic contact film 5 can be carried out by dry etching using a publicly-known gas composition (for example, a mixture gas of $SF_6$ and $O_2$, or a mixture gas of $CF_4$ and $O_2$).

Figure 2C:
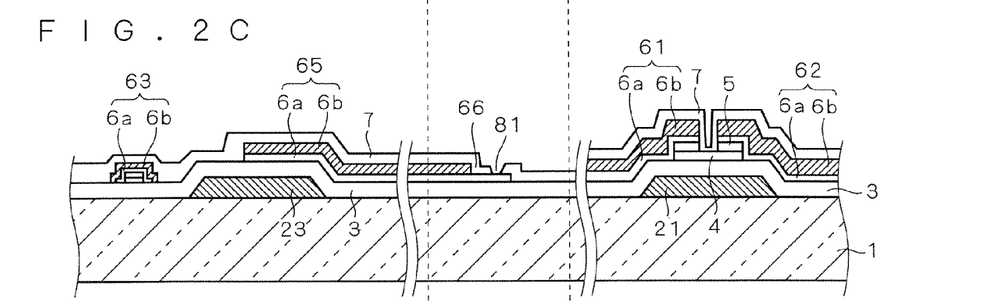

Next, as illustrated in FIG. 2C, the second conductive film is deposited using sputtering or the like. The second conductive film is made up of a first layer 6a made of, for example, chromium, molybdenum, tantalum, titanium, or an alloy having any of these elements as its main component, and a second layer 6b made of aluminum, silver (Ag), or an alloy having any of these elements as its main component. Here, the first layer 6a is deposited over the ohmic contact layer 5 and the first insulating film 3 so as to be directly in contact therewith. On the other hand, the second layer 6b is deposited overlaying the first layer 6a so as to be directly in contact therewith. Since the second conductive film is used as the source line 63 and the reflective pixel electrode 65, it needs to be constructed taking into account the wiring line resistance and the reflection characteristics of the surface layer. In the present preferred embodiment, a chromium film having a film thickness of 100 nm and a AlCu film having a film thickness of 300 nm are deposited as the first layer 6a and the second layer 6b of the second conductive film, respectively.

It should be noted that it is preferable to use, as the second conductive film, a metallic thin film that does not cause surface oxidation easily or a metallic thin film that exhibits conductivity even if oxidized, since the contact hole 81 will be formed in the second conductive film by dry etching in a later-described process step and a conductive thin film (transparent conductive film) for obtaining electrical contact will be formed within a portion of the contact hole 81. In addition, in the case that an Al-based material is used as the second conductive film, it is recommended that either an aluminum nitride film or a film of Cr, Mo, Ta, Ti, or the like be formed in order to prevent degradation in conductivity resulting from surface oxidation.

Next, the second conductive film is patterned in a third photolithography process step to form the source line 63 provided with the source electrode 61 and the reflective pixel electrode 65 provided with the drain electrode 62. It should be noted that the drain electrode 62 and the reflective pixel electrode 65 are continuously formed in a same layer and electrically connected within the same layer. The etching of the second conductive film may be carried out by wet etching using a publicly known etchant.

Subsequently, a center portion of the ohmic contact film 5 of the TFT 64 is etched away to expose the semiconductor active film 4. The etching of the ohmic contact film 5 may be carried out by dry etching using a publicly known gas composition (for example, a mixture gas of $SF_6$ and $O_2$, or a mixture gas of $CF_4$ and $O_2$).

It is also possible to form a contact area 66 by removing a portion of the second layer 6b of AlCu where the later-described contact hole 81 is to be formed. This contact area 66 can be formed in the third photolithography process step by performing exposure using a technique such as halftone exposure so that the thickness of the portion of the photoresist that is to be removed can be finished to be thin, carrying out a film-reducing process for the resist using oxygen plasma or the like after the dry etching of the ohmic contact film 5 to remove only the portion of the resist to be removed, and wet etching the AlCu. Thereby, the surface of the second conductive film that is in contact with the later-described transmissive pixel electrode 91 is formed by the chromium film of the first layer 6a, thus making it possible to obtain a contact surface with good conductivity.

Here, the process of the halftone exposure is discussed. In the halftone exposure, the film thickness of remaining photoresist is controlled while adjusting the intensity of exposure by performing exposure through a halftone photomask (for example, a photomask with varied shades in a pattern formed of Cr). Thereafter, the portion of the film from which the photoresist has been completely removed is first subjected to etching. Next, the photoresist is subjected to a film-reducing process using oxygen plasma or the like, and thereby, only the portion of the photoresist that has a small remaining film thickness is removed. Then, the portion of the film where the film thickness of the remaining photoresist is small (where the photoresist has been removed) is subjected to etching. In this way, patterning corresponding to two process steps is possible with a single photolithography process step.

When an aluminum nitride film (for example, AlCuN) or the like is formed on the surface of the second conductive film, good contact with the later-described transmissive pixel electrode 91 is obtained although reflectivity is somewhat reduced; therefore, it is not absolutely necessary to form the contact area 66 and the halftone exposure process may be omitted.

Next, as illustrated in FIG. 2C, the second insulating film 7 is deposited by using plasma CVD or the like. The second insulating film 7 may be formed of the same material as that of the first insulating film 3, and it is preferable that the film thickness be determined taking the coverage of the pattern of the underlying layers into consideration. In the present preferred embodiment, a SiN film having a film thickness of 500 nm is deposited as the second insulating film 7.

Then, as illustrated in FIG. 2C, the second insulating film 7 is patterned in a fourth photolithography process step to form the contact hole 81 at a portion above the reflective pixel electrode 65. The etching of the second insulating film 7 can be carried out by wet etching using a publicly known etchant or by dry etching using a publicly known gas composition.

Figure 2D:
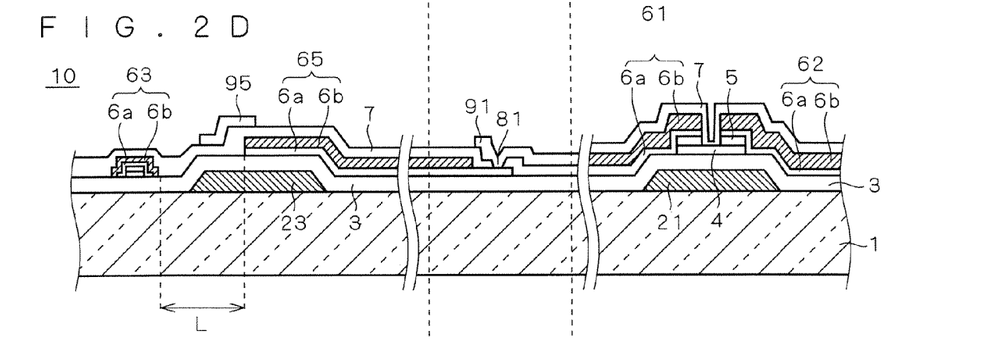

Next, as illustrated in FIG. 2D, a transparent conductive film that forms the later-described transmissive pixel electrode 91 is deposited by using sputtering or the like. ITO (Indium-Tin-Oxide), $SnO_2$, or the like may be used as the transparent conductive film, and it is particularly preferable to use ITO from the viewpoint of chemical stability. It should be noted that the ITO may be either crystallized ITO or amorphous ITO (a-ITO), but when using a-ITO, it is necessary to heat it to a crystallization temperature of 180° C. or higher to crystallize it after the patterning. In the present preferred embodiment, an a-ITO having a film thickness of 80 nm is deposited as the transparent conductive film.

Next, as illustrated in FIG. 2D, the transparent conductive film is patterned in a fifth photolithography process step to form the transmissive pixel electrode 91 of the transmissive region T. Taking displacement or the like in the patterning into consideration, the transmissive pixel electrode 91 is formed so as to partially overlap with the reflective pixel electrode 65 over the second insulating film 7 in a boundary portion between the reflective region S and the transmissive region T. By not forming the transparent conductive film in the region of the reflective region S other than the boundary portion, reflectivity is prevented from degrading. In addition, it makes possible to prevent voltage reduction between the transparent conductive film and the first insulating film 3 and between the transparent conductive film and the second insulating film 7, and therefore, the voltage of the transmissive pixel electrode 91 and that of the reflective pixel electrode 65 can be set at substantially the same potential. The sidewall portion of the contact hole 81, which corresponds to the connecting portion between the reflective pixel electrode 65 and the transmissive pixel electrode 91 is covered by the transparent conductive film. Thus, the TFT substrate 10 according to the present preferred embodiment is formed.

Figure 3:
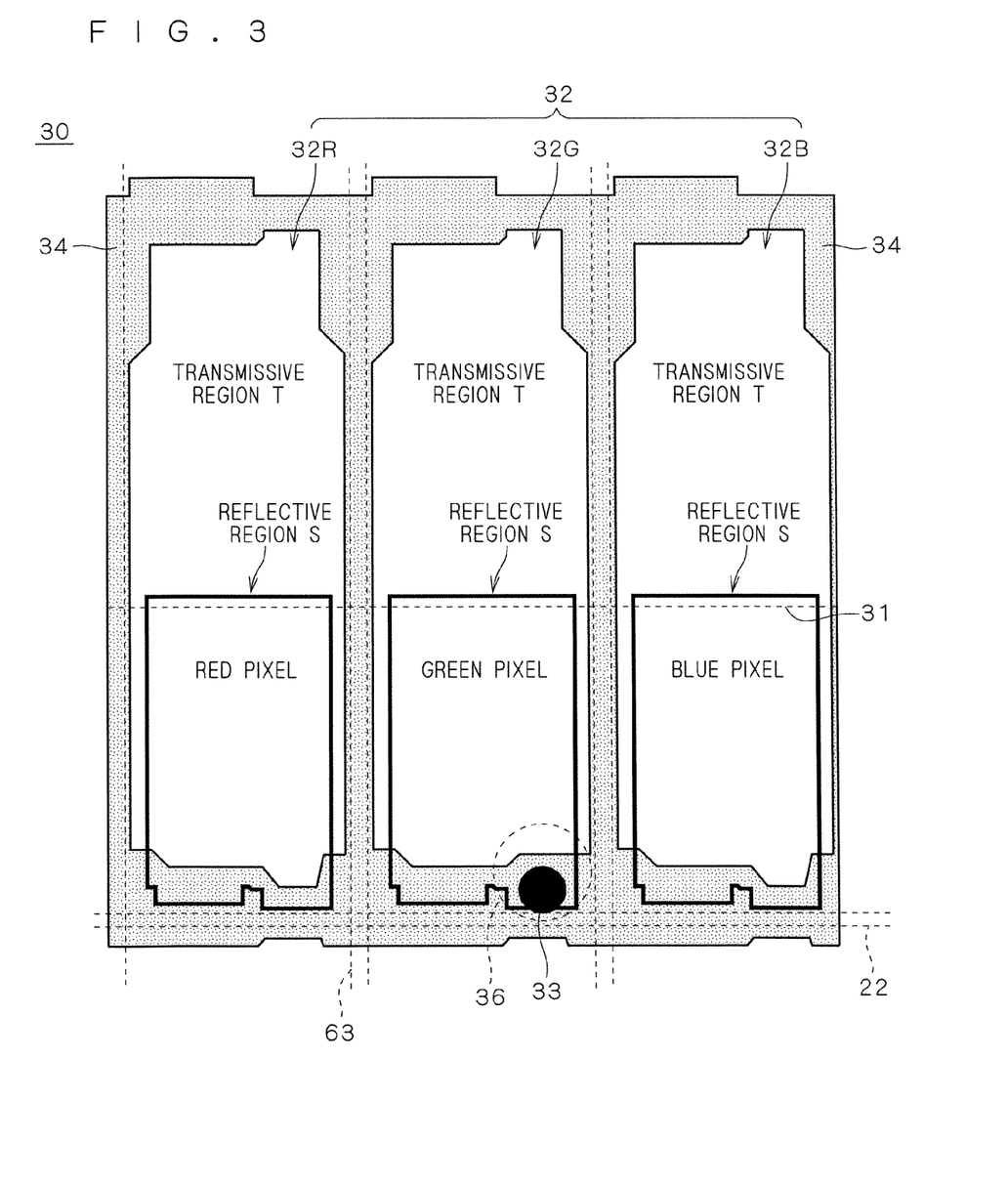
FIG. 3 is a plan view illustrating a color filter substrate of the transflective liquid crystal display device according to the preferred embodiment of the present invention.

Next, the structure of the color filter substrate 30 of the transflective liquid crystal display device according to the present preferred embodiment will be described. FIG. 3 illustrates a plan view of one picture element (a grouped unit of three pixels including a red pixel, a green pixel, and a blue pixel) in the color filter substrate 30. Each of the pixels shown in FIG. 3 is divided into a transmissive region T and a reflective region S, and a transparent resin layer 31 is disposed in the reflective region S in order to vary the thickness of the liquid crystal layer between the transmissive region T and the reflective region S. The transparent resin layer 31 may be disposed either under the coloring material 32 or above the coloring material 32, and the present preferred embodiment employs the construction in which it is disposed under the coloring material 32. Then, in FIG. 3, a red coloring material 32R, a green coloring material 32G, and a blue coloring material 32B are formed respectively in the red pixel, the green pixel, and the blue pixel, and a light-blocking film 34 for preventing light leakage from the gate line 22, the source line 63, and so forth. The structure of these components will be discussed in detail in the manufacturing method for the later-described color filter substrate 30.

Providing the transparent resin layer 31 in the reflective regions S produces a level difference or a step at the boundary between the reflective regions S and the transmissive region T, causing a disorder in the alignment state of liquid crystal in the area near the level difference. The contrast of transflective liquid crystal display device greatly differs between the reflective mode and the transmissive mode, and the contrast in the transmissive mode is usually 100 or greater, while the contrast in the reflective mode is about 50 at greatest. The difference in contrast, which originates from a difference in principles, occurs in that, because the reflective mode utilizes external light when performing a display operation, the surface reflection of the liquid crystal display device is added to the brightness of black display. Therefore, it is necessary to choose whether the portion in which the alignment state of liquid crystal is disordered (the stepped portion) should be provided with a light-blocking film (black matrix) to shield light, or that portion should be disposed within the reflective region S. The present preferred embodiment adopts the design in which the stepped portion is disposed within the reflective region S as illustrated in FIG. 3, in perspective from the concern for decrease in the reflective region S. Moreover, in the present preferred embodiment, the distance from the stepped portion to the transmissive region T is set at 8 μm, taking into account variation in the overlap between the TFT array substrate 10 and the color filter substrate 30, positional accuracy and variation in forming the transparent resin layer 31, variation in forming the reflective pixel electrode 65, and the like.

Next, the present preferred embodiment adopts the structure in which columnar spacers 33 are provided in green pixels of the color filter substrate 30. Referring to FIG. 3, a columnar spacer 33 is disposed on the color filter substrate 30 in the vicinity of a location opposing the gate line 22 on the TFT array substrate 10. In the present invention, the columnar spacer 33 is not necessarily disposed in the vicinity of a location opposing the gate line 22, but may be disposed in the vicinity of a location opposing the source line 63 or in the vicinity of a location opposing the TFT 64, over both of which the light-blocking film 34 is disposed. In disposing a columnar spacer 33, the portion shaded by the columnar spacer 33 produces a defective alignment region of liquid crystal. Therefore, it is necessary to provide a light-blocking portion 36 in a region including the defective alignment region surrounding the columnar spacer 33, in addition to the size of the columnar spacer 33. That is, in the present preferred embodiment, the light-blocking portion 36 is provided in a predetermined region in the vicinity of a location where the columnar spacer 33 is formed. In FIG. 3, the locations opposing the gate line 22 and the source line 63 are indicated by dashed lines.

Although it may depend on the method of alignment process, in the present preferred embodiment, the light-blocking portion 36 is designed so as to prevent light leakage from the columnar spacer 33 and the defective alignment region with setting the diameter of the columnar spacer 33 at 20 μm and defining the area of 25 μm diameter that surrounds the columnar spacer 33 as a defective alignment region. In FIG. 3, the columnar spacer 33 is disposed in the green pixel while no columnar spacer 33 is disposed in the red pixel or in the blue pixel. Accordingly, the light-blocking portion 36 is disposed only in the green pixel, in which the columnar spacer 33 is disposed, and no light-blocking portion 36 is provided in the other pixels.

The height of columnar spacers 33 may be optimized according to the thickness of the liquid crystal layer in the reflective regions S. The optimum set value varies depending on the type of the material on the opposing TFT array substrate 10 and the type of material for the undercoat film of the columnar spacers 33, and it needs to be optimized from device to device. However, the thickness of the liquid crystal layer in the transmissive region T cannot be made so great because of the limitation on the response speed characteristics. Moreover, if the thickness of the liquid crystal layer in the reflective region S is made excessively thick, white display in a reflection mode becomes excessively yellowish. Moreover, as mentioned previously, the thickness of the liquid crystal layer in the reflective region S needs to be set at about ½ of the thickness of the liquid crystal layer in the transmissive region T. For these reasons, it is necessary that the thickness of the liquid crystal layer in the reflective region S be set at from about 1 μm to about 3 μm. In the present preferred embodiment, the thickness of the liquid crystal layer in the reflective region S was set at 2 μm and the height of the columnar spacer 33 was set at 2.2 μm. The thickness of the liquid crystal layer in the transmissive region T was set at 3.8 μm.

The coloring materials 32 in the transflective liquid crystal display device according to the present invention are disposed in a striped pattern or a dotted pattern. The coloring materials 32 adjacent to each other may be disposed overlapping with one another or may be disposed so as to keep a certain gap therebetween. The film thickness of the coloring materials 32 is set at from about 0.5 μm to about 3.5 μm, although it may vary depending on desired color characteristics. In the present preferred embodiment, the thickness of the coloring materials 32 is set at 1.2 μm in order to obtain a color reproduction range (Gamut) of 50%. In addition, in order to eliminate color variation due to the thickness of the liquid crystal layer across the reflective regions S, the red, blue, and green pixels are adjusted to have the same thickness. Moreover, because there is a concern for short-circuiting with the opposing TFT array substrate 10 if the arrangement in which adjacent coloring materials 32 are overlapped is adopted, the present preferred embodiment adopts a striped shape as the shape of the coloring materials 32 and an arrangement in which the coloring materials 32 adjacent to each other are spaced 5 μm, taking positioning accuracy and variation in the shape of the coloring materials 32 into consideration.

Next, a manufacturing method of the color filter substrate 30 of the transflective liquid crystal display device according to the present preferred embodiment is described with reference to FIGS. 4A to 4H and 5A to 5H. It should be noted that FIGS. 4A through 4H illustrate cross-sectional views of the reflective regions S of the color filter substrate 30, and FIGS. 5A through 5H illustrate cross-sectional views of the transmissive regions T of the color filter substrate 30.

Figure 4A:
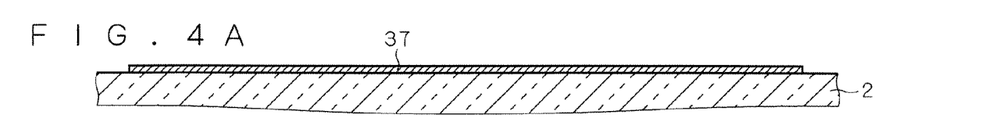
FIGS. 4A through 4H are cross-sectional views illustrating the color filter substrate of the transflective liquid crystal display device according to the preferred embodiment of the present invention.
Figure 4B:
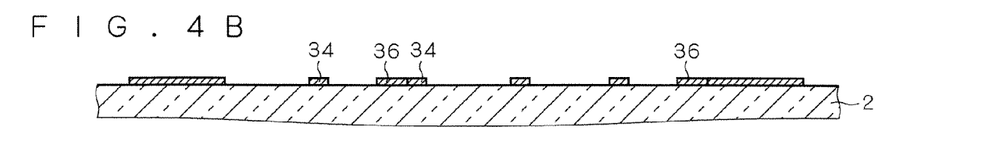
Figure 5A:
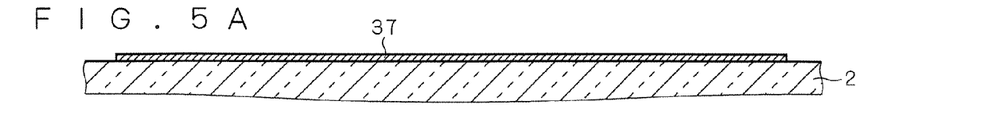
FIGS. 5A through 5H are cross-sectional views illustrating the color filter substrate of the transflective liquid crystal display device according to the preferred embodiment of the present invention.
Figure 5B:
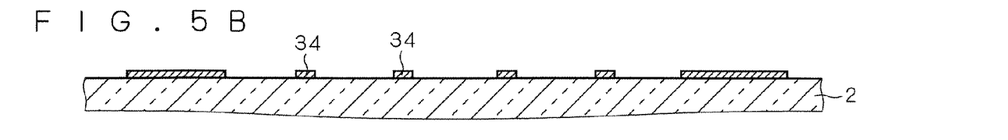

First, a transparent insulative substrate 2 made of a glass substrate or the like is washed to clean the surfaces. After washing the substrate, a film 37 having light blocking properties is deposited on the transparent insulative substrate 2 by sputtering, spin coating, or the like, as illustrated in FIGS. 4A and 5A. Then, as illustrated in FIGS. 4B and 5B, the film 37 having light blocking properties is patterned to form the light-blocking film 34 and the light-blocking portions 36 which are provided in the vicinity of the locations where the columnar spacers 33 are disposed. Specifically, a photosensitive resist is applied to the film 37 having light blocking properties and subjected to exposure and development by a photomechanical process, to form the patterns of the light-blocking film 34 and so forth. It should be noted that a multilayer structure of chromium oxide film or nickel oxide film, or a black region may be used as the film 37 having light blocking properties, for the purpose of making the outer appearance of the transparent insulative substrate 2 black. The present preferred embodiment employs a multilayer film of chromium oxide, and its film thickness is set at 150 nm.

Figure 4C:
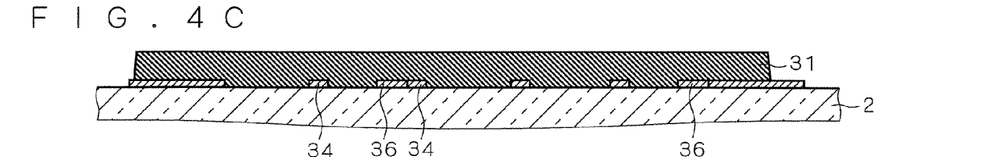
Figure 5C:
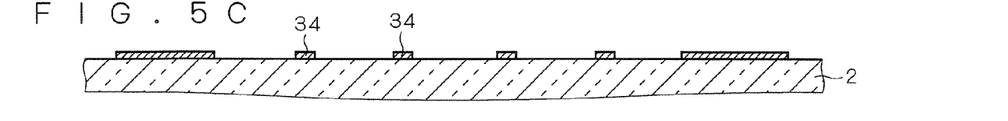
Figure 5D:
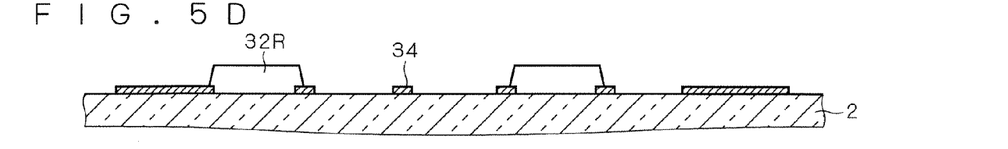
Figure 5E:
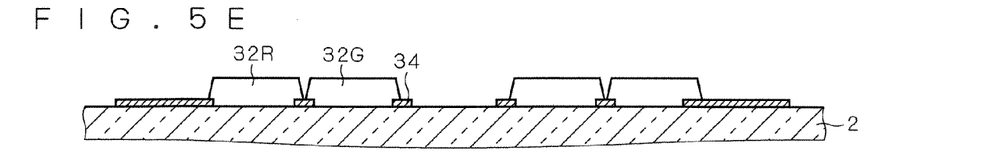
Figure 5F:
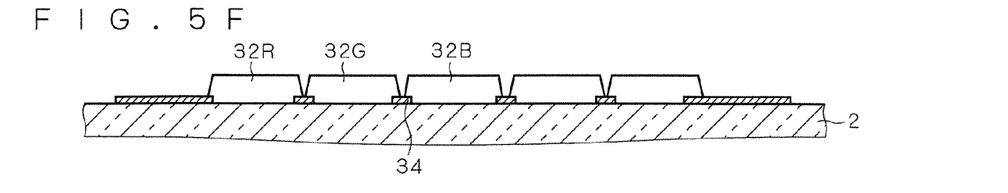

Next, as illustrated in FIGS. 4C and 5C, the transparent resin layer 31 for adjusting the thickness of the liquid crystal layer in the reflective regions S and the transmissive regions T is formed only over the reflective regions S. The transparent resin layer 31 may be formed by applying a film on the transparent insulative substrate 2 to a desired thickness by spin coating or the like, and subjecting the film to exposure and development. It should be noted that it is necessary to carry out film-thickness setting for the coloring materials 32 and the transparent resin layer 31, in order to vary the thickness of the liquid crystal layer between the reflective region S and the transmissive region T. Assuming that the film thickness of the coloring materials 32 in the transmissive regions T is 1.2 μm, the film thickness of the coloring materials 32 applied on the transparent resin layer 31 (the film thickness of the coloring materials 32 in the reflective regions S) is about 70%. In other words, the difference between the thickness of the coloring materials 32 in the transmissive regions T and the thickness of the coloring materials 32 on the transparent resin layer 31 is: 1.2 μm×(−30%)=−0.36 μm. Accordingly, the film thickness of the transparent resin layer 31 is set at 1.44 μm, which is obtained by subtracting the difference −0.36 μm in the coloring materials 32 and the film thickness difference 0.72 μm between the transmissive region T and the reflective region S on the TFT array substrate 10 from 1.8 μm, which is obtained by subtracting the thickness of the liquid crystal layer in the reflective region S 2.0 μm from the thickness of the liquid crystal layer in the transmissive region T 3.8 μm.

Figure 6:
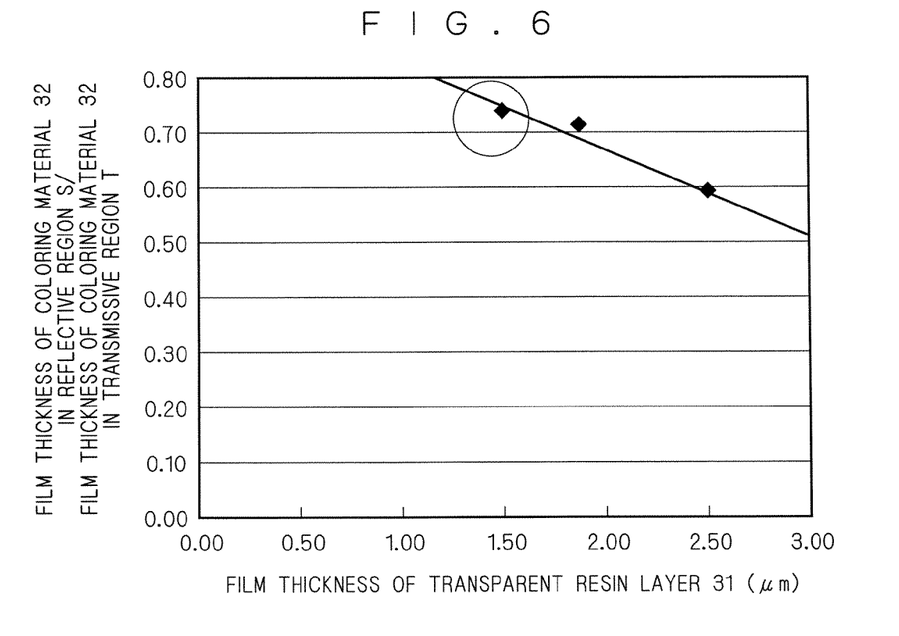
FIG. 6 is a graph for illustrating a relationship between the film thickness of a coloring material in a reflective region and the film thickness of the transparent resin layer of a transflective liquid crystal display device according to a preferred embodiment of the present invention.

The film thickness of the coloring materials 32 formed on the transparent resin layer 31 varies depending on the film thickness of the transparent resin layer 31 and the film thickness of the coloring materials 32 in the transmissive region T. FIG. 6 shows a correlation between the film thickness of the transparent resin layer 31 and the film thickness of the coloring materials 32 in the reflective region S when it is assumed that the film thickness of the coloring materials 32 in the transmissive region T is 1.2 μm. In FIG. 6, the horizontal axis represents film thickness (μm) of the transparent resin layer 31, and the vertical axis represents the ratio of the film thickness of the coloring materials 32 in the transmissive region T with respect to the film thickness of the coloring materials 32 in the reflective region S.

Figure 7:
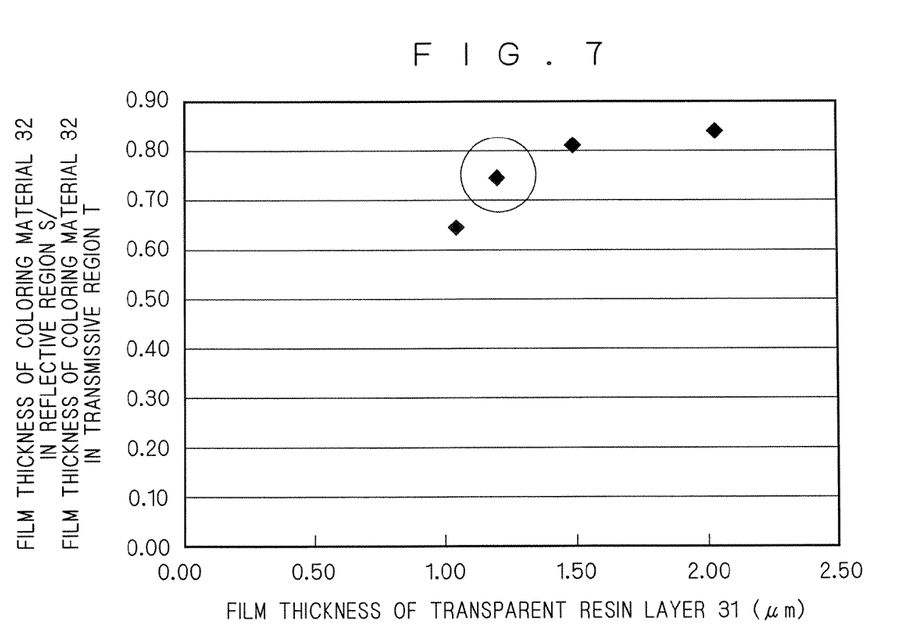
FIG. 7 is a graph for illustrating a relationship between the film thickness of a coloring material in a reflective region and the film thickness of a coloring material in a transmissive region of a transflective liquid crystal display device according to a preferred embodiment of the present invention.

Likewise, FIG. 7 illustrates a correlation between the film thickness of the coloring materials 32 in the transmissive region T and the film thickness of the coloring materials 32 in the reflective region S when it is assumed that the film thickness of the transparent resin layer 31 is 1.7 μm. In FIG. 7, the horizontal axis represents the film thickness of the coloring materials 32 in the transmissive region T (μm), and the vertical axis represents the ratio of the film thickness of the coloring materials 32 in the transmissive region T with respect to the film thickness of the coloring materials 32 in the reflective region S. Taking the required color characteristics and the thickness of the liquid crystal layer into consideration, the film thickness of the transparent resin layer 31 and the film thickness of the coloring materials 32 should be set using the relationships shown in FIGS. 6 and 7. In the present preferred embodiment, the film thickness of the transparent resin layer 31 and the film thickness of the coloring materials 32 were set at the points indicated by the circles in FIGS. 6 and 7.

Next, as illustrated in FIGS. 4D to 4F and 5D to 5F, the coloring materials 32 are applied. The sequence of applying the color materials may be in any sequence. In the present preferred embodiment, the coloring materials were applied as follows; first, the red coloring material 32R in FIGS. 4D and FIG. 5D, then the green coloring material 32G in FIGS. 4E and 5E, and then the blue coloring material 32B in FIGS. 4F and 5F. Since the same application process step is repeated for all the coloring materials 32, application of the red material 32R is described in detail herein. First, the red coloring material 32R is applied over the entire substrate surface by spin coating or the like. Then, the film thickness of the coloring material 32R is controlled so as to be 1.2 μm. Subsequently, exposure and development are performed by a photomechanical process to form the coloring material 32R having a predetermined pattern.

Figures 4D, 4E, 4F, 4G:
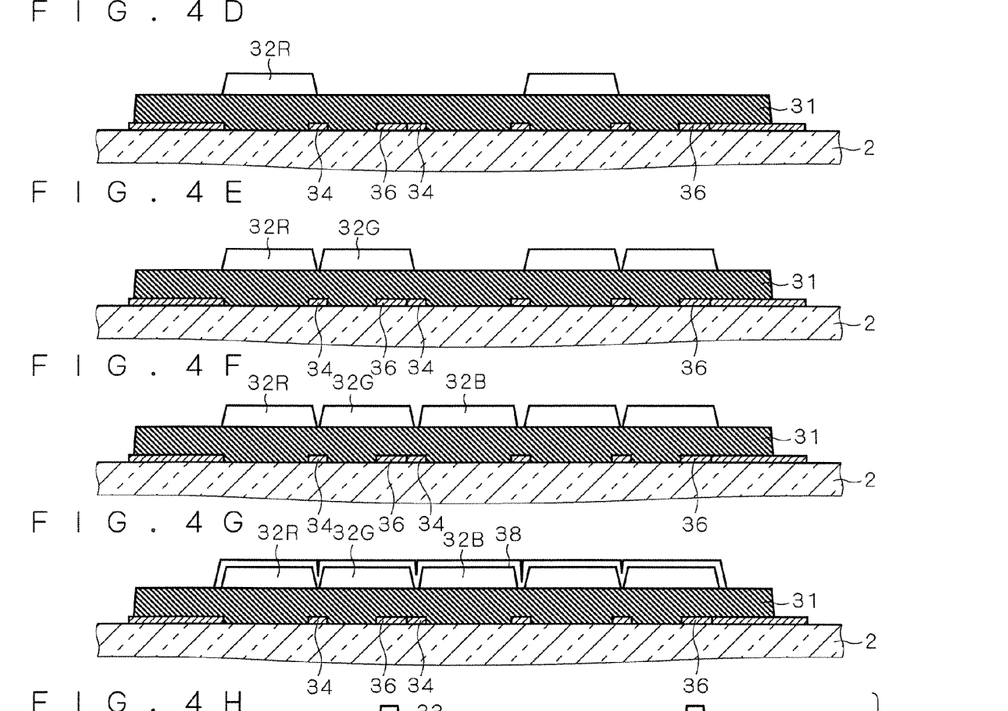
Figure 5G:
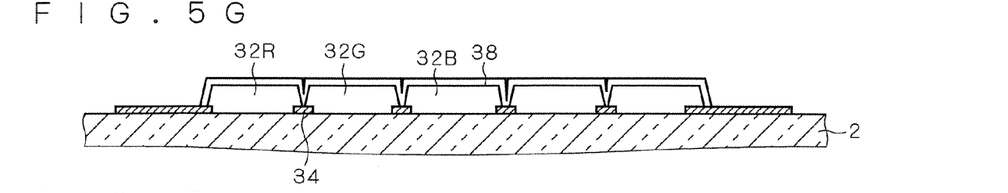

Next, as illustrated in FIGS. 4G and 5G, a transparent electrode 38 is formed over the coloring materials 32. Specifically, the transparent electrode 38 that is an ITO film is deposited over the coloring materials 32 by mask sputtering or vapor deposition. In the present preferred embodiment, the transparent electrode 38 was formed by mask sputtering and the film thickness is set at 1450 angstroms (0.145 μm).

Figure 4H:
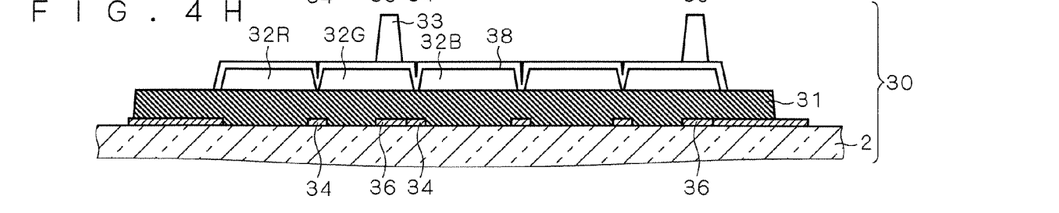
Figure 5H:
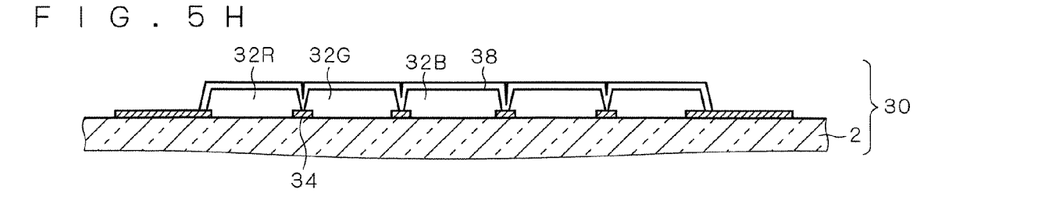

Finally, as illustrated in FIG. 4H, columnar spacers 33 are formed on the transparent electrode 38 above the pixels in which the green coloring material 32G is formed. Generally, after a film of transparent resin is applied using a slitting and spinning technique or the like, a pattern of columnar spacers 33 is formed by a photomechanical process. Since the columnar spacers 33 require uniformity and rigidness in the film applied, the present preferred embodiment employs NN780 made by JSR Corp. to set the film thickness to be 2.2 μm. It should be noted that no columnar spacers 33 are provided in the transmissive regions T. as illustrated in FIG. 5H.

Hereinbelow, reference is not particularly made to the drawings. In subsequent process steps for forming a cell, alignment films are applied to the TFT array substrate 10 and the color filter substrate 30 that have been formed in the foregoing manner, which are subjected to a rubbing process in certain directions. Then, a sealant material for bonding the two substrates is applied onto one of the substrates. At the same time as the application of the sealant material, a transfer electrode for electrically connecting the two substrates is also disposed. The TFT array substrate 10 and the color filter substrate 30 are overlaid so that their alignment films face each other, and after positioning, the sealant material is cured to bond the two substrates together.

Herein, examples of the sealant material used include a thermosetting epoxy-based resin and a photocurable acrylic resin. The present preferred embodiment employs MP-3900 made by Nippon Kayaku Co., Ltd., which is a sealant material of thermosetting epoxy-based resin. Examples of the material for the transfer electrode include silver paste and electrically conductive particles that are mixed in the sealant material. In the present preferred embodiment, Au-coated Micropearl (registered trademark) (diameter 5.0 μm) Sekisui Chemical Co., Ltd. was mixed in the sealant material. After bonding the TFT array substrate 10 and the color filter substrate 30 together, a liquid crystal material is filled between the two substrates. After bonding polarizing plates on both sides of the liquid crystal panel formed in the foregoing manner, a backlight unit is attached to the back side thereof, and so forth, and thus, a transflective liquid crystal display device is completed.

As described above, the transflective liquid crystal display device according to the present preferred embodiment can prevent the light leakage from alignment defects in the vicinity of the columnar spacers 33 because the columnar spacers 33 are disposed in green color pixels and the light-blocking portions 36 are provided in the vicinity of locations where the columnar spacers 33 are disposed while no light-blocking portions 36 are provided in the red or blue color pixels. Moreover, the transflective liquid crystal display device according to the present preferred embodiment can inhibit white display in the reflective mode from turning yellowish because the aperture area of the reflective region S in the green color pixel is less than the aperture area of the reflective region S in the red or blue color pixel. Furthermore, the transflective liquid crystal display device according to the present preferred embodiment can also suppress decrease in reflectivity because the aperture areas of the red and blue color pixels are not reduced.

Figure 8:
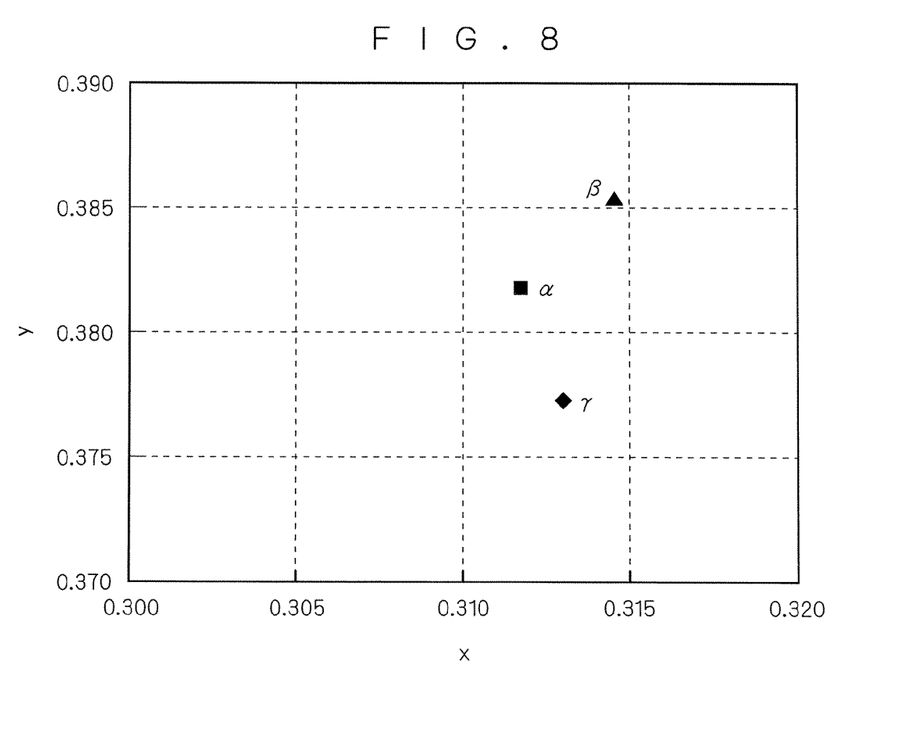
FIG. 8 is a graph illustrating chromaticity of white color in a reflective region of the transflective liquid crystal display device according to the preferred embodiment of the present invention.

FIG. 8 illustrates, as a comparative example, chromaticity a for white in the case that the shapes of the light-blocking film 34 disposed for the red, green, and blue color filters are common, chromaticity β for white in the case that the columnar spacers 33 are disposed in blue color pixels and the light-blocking portions 36 are disposed only in the vicinity thereof, and chromaticity γ for white in the case that the columnar spacers 33 are disposed in the green color pixels and the light-blocking portions 36 are disposed only in the vicinity thereof. The chromaticity for white shown in FIG. 8 is that in the reflective mode, measured using a D65 light source commonly used as sunlight. It should be noted that the D65 light source is mentioned merely as an illustrative example, and the advantageous effects of the present invention are not affected by the types of light sources. In FIG. 8, the measurement is conducted assuming that the pixel size is 100 μm×300 μm and that the aperture ratio of the reflective region S is 32% if the light-blocking portions 36 are provided, or 34% if they are not provided. The transflective liquid crystal display device according to the present preferred embodiment yields the chromaticity γ for white in the case that the columnar spacers 33 are disposed in the green color pixels and the light-blocking portions 36 are disposed only in the vicinity thereof, and it will be appreciated from the results shown in FIG. 8 that the chromaticity γ for white exhibits bluish characteristics in comparison with the chromaticity a for white in the case that the shapes of the light-blocking film 34 are common.

As discussed in explaining the structure of the TFT array substrate 10 and the manufacturing method, the surface of the TFT array substrate 10 has multilayers of films formed thereon and there exists an uneven surface portion with an arbitrary thickness. For that reason, it is desirable that the columnar spacers 33 be disposed on flat portions on the TFT array substrate 10 and on the light-blocking film 34 of the color filter substrate 30. Taking these into account, in the present preferred embodiment, the columnar spacers 33 were disposed at locations on the TFT array substrate 10 corresponding to the gate line 22. By disposing the columnar spacers 33 at locations corresponding to flat portions on the TFT array substrate 10, variation in the thickness of the liquid crystal layer can be minimized.

Moreover, when the columnar spacers 33 are disposed in reflective regions S, the height of the columnar spacers 33 can be reduced by the film thickness of the transparent resin layer 31, and can be made ½ of the case that they are provided in transmissive regions T. Thereby, the amount of resin used for forming the columnar spacers 33 becomes ½, making cost reduction possible.

As described above, by adjusting the arrangement of the columnar spacers 33, variation in the thickness of the liquid crystal layer can be minimized and moreover the amount of resin used for the columnar spacers 33 can be reduced. In addition, by adjusting the arrangement of the columnar spacers 33, it is made possible to form a transflective liquid crystal display device that does not cause display unevenness due to variation the thickness of the liquid crystal layer, and to fabricate the color filter used therefor at lower cost.

Figure 9:
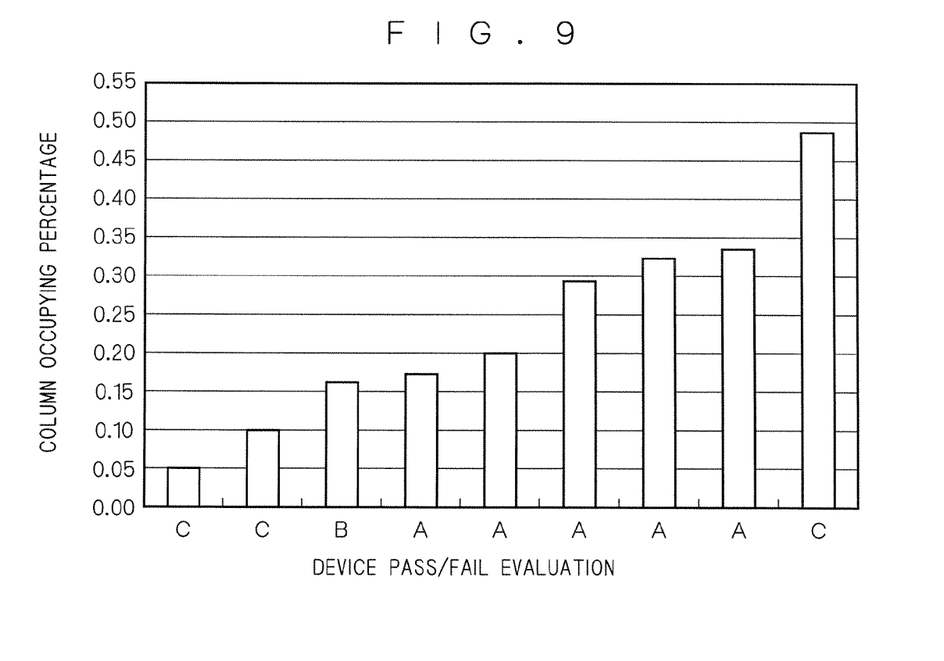
FIG. 9 is a graph illustrating a relationship between column occupying percentage and device pass/fail evaluation of the transflective liquid crystal display device according to the preferred embodiment of the present invention.

Columnar spacers 33 are advantageous in terms of accuracy in height, size, and disposed locations because they are formed from a uniformly applied organic film by a photomechanical process. On the other hand, because of the advantageous characteristics, it is necessary to conduct designing taking the arrangement density (column occupying percentage) into consideration. FIG. 9 illustrates a relationship between column occupying percentage of the columnar spacers 33 with respect to display area and device pass/fail evaluation. In FIG. 9, the vertical axis represents column occupying percentage (%) while the horizontal axis represents device pass/fail evaluation corresponding to the column occupying percentage. Herein, the column occupying percentage refers to the occupying percentage of the columnar spacers 33 with respect to a display area of a transflective liquid crystal display device according to the present preferred embodiment, which indicates the arrangement density of the columnar spacers 33. The device pass/fail evaluation was made as follows; C indicates that the device is problematic, B indicates that the device is within a permissible level, and A indicates that the device is sufficiently satisfactory.

If the column occupying percentage of the columnar spacers 33 is too high, the liquid crystal layer will lose the degree of freedom to deform, and consequently the device's margin for temperature variation reduces. Therefore, in FIG. 9, when the column occupying percentage is 0.49%, the device pass/fail evaluation results will be determined as C from the viewpoints of decrease in manufacturing margin and bubble formation under a low-temperature environment.

Specifically, under a high-temperature environment, liquid crystal material expands and becomes larger in volume than the presumed volume of the liquid crystal layer, resulting in excessive liquid crystal material. Since the height of the columnar spacers 33 is uniform, the excessive liquid crystal material becomes greater than a certain amount, the liquid crystal material amount exceeds the height of the columnar spacers 3 This excessive liquid crystal material accumulates in a lower portion of the display panel due to gravitational forces, increasing the thickness of the liquid crystal layer of that portion in comparison with the other portion; consequently, that portion will not yield predetermined optical characteristics, causing display unevenness. On the other hand, under a low-temperature environment, liquid crystal material shrinks. If the internal volume of the liquid crystal panel cannot follow the shrinkage of the liquid crystal material, the inside of the liquid crystal panel will have a negative pressure and consequently a gas will form from the liquid crystal layer or from the organic materials constituting the liquid crystal layer, forming bubbles. In view of this problem, with a liquid crystal display device using the columnar spacers 33, the substrates need to be bonded together while a certain degree of stress is being applied to the columnar spacers 33 so that the columnar spacers 33 are contracted. However, if the column occupying percentage of the columnar spacers 33 is too high, the liquid crystal layer will lose the degree of freedom to deform and the device's margin for temperature variation will decrease; consequently, the device pass/fail evaluation is determined as C.

Conversely, if the column occupying percentage of the columnar spacers 33 is too low, the liquid crystal panel will not be able to withstand general external forces that act thereon (for example, a pressure applied to the liquid crystal panel surface by a human hand and an impact caused by an object that hits the liquid crystal panel surface) and the columnar spacers 33 will change in shape. For that reason, the column occupying percentage of the columnar spacers 33 needs to be greater than a certain value. It will be understood from the results shown in FIG. 9 that when the column occupying percentage of the columnar spacers 33 becomes equal to or less than 0.1%, the proof stress is obviously lost, and the lower limit of the permissible level B is 0.15%.

As discussed above, the results of the experiment shown in FIG. 9 demonstrate that it is desirable that the column occupying percentage of the columnar spacers 33 be within the range of from 0.15% to 0.35%. From the pixel pitch and the width of the light-blocking film formed on the color filter, the column occupying percentage of the columnar spacers 33 was set at 0.29% in the present preferred embodiment. Thus, the present preferred embodiment makes it possible to attain a transflective liquid crystal display device in which no display unevenness occurs or no bubbles form even when the temperature of the environment changes from −55° C. to 100° C., and in which the columnar spacers 33 do not deform and no display unevenness occurs even when general external forces are applied to the surface.

While the invention has been shown and described in detail, the foregoing description is in all aspects illustrative and not restrictive. It is therefore understood that numerous other modifications and variations can be devised without departing from the scope of the invention.

What is claimed is:

1. A transflective liquid crystal display device, comprising:
    a first substrate having a light-blocking film and a color filter in which red, green, and blue coloring materials form respective pixels;
    a second substrate having a transmissive pixel electrode that forms transmissive regions within said pixels, a reflective pixel electrode that forms reflective regions within said pixels, and wiring lines for supplying a control signal and a signal applied to said transmissive pixel electrode and said reflective pixel electrode;
    a liquid crystal material sandwiched by said first substrate and said second substrate; and
    columnar spacers formed in said reflective regions having said green coloring material, and defining a gap between said first substrate and said second substrate, no columnar spacers being formed in the regions having said red and said blue coloring material, wherein
    said first substrate further has light-blocking portions formed in the same layer as said light-blocking film in a region surrounding said columnar spacers and only in said reflective regions of said pixels having said green coloring material, said light-blocking portions increasing the area of said light-blocking film so that said reflective regions of said blue coloring material and said red coloring material are equal and said reflective region of green coloring material is smaller than said reflective region of said blue coloring material and of said red coloring material, and in said reflection region of each pixel defined by the light blocking film, said blue coloring material, said red coloring material and said green coloring material do not have an opening and a notch.

2. The transflective liquid crystal display device according to claim 1, wherein said columnar spacers are provided in the vicinity of said wiring lines or where they overlap said wiring lines.

3. The transflective liquid crystal display device according to claim 1, wherein an occupying percentage of said columnar spacers is from 0.15% to 0.35% with respect to a display area.

4. The transflective liquid crystal display device according to claim 2, wherein an occupying percentage of said columnar spacers is from 0.15% to 0.35% with respect to a display area.

5. The transflective liquid crystal display device according to claim 1, wherein said transmissive region of said each pixel and said reflective region are disposed in parallel.

6. The transflective liquid crystal display device according to claim 1, wherein said transmissive region of said each pixel is equal.

* * * * *